United States Patent Office 3,112,390
Patented Nov. 26, 1963

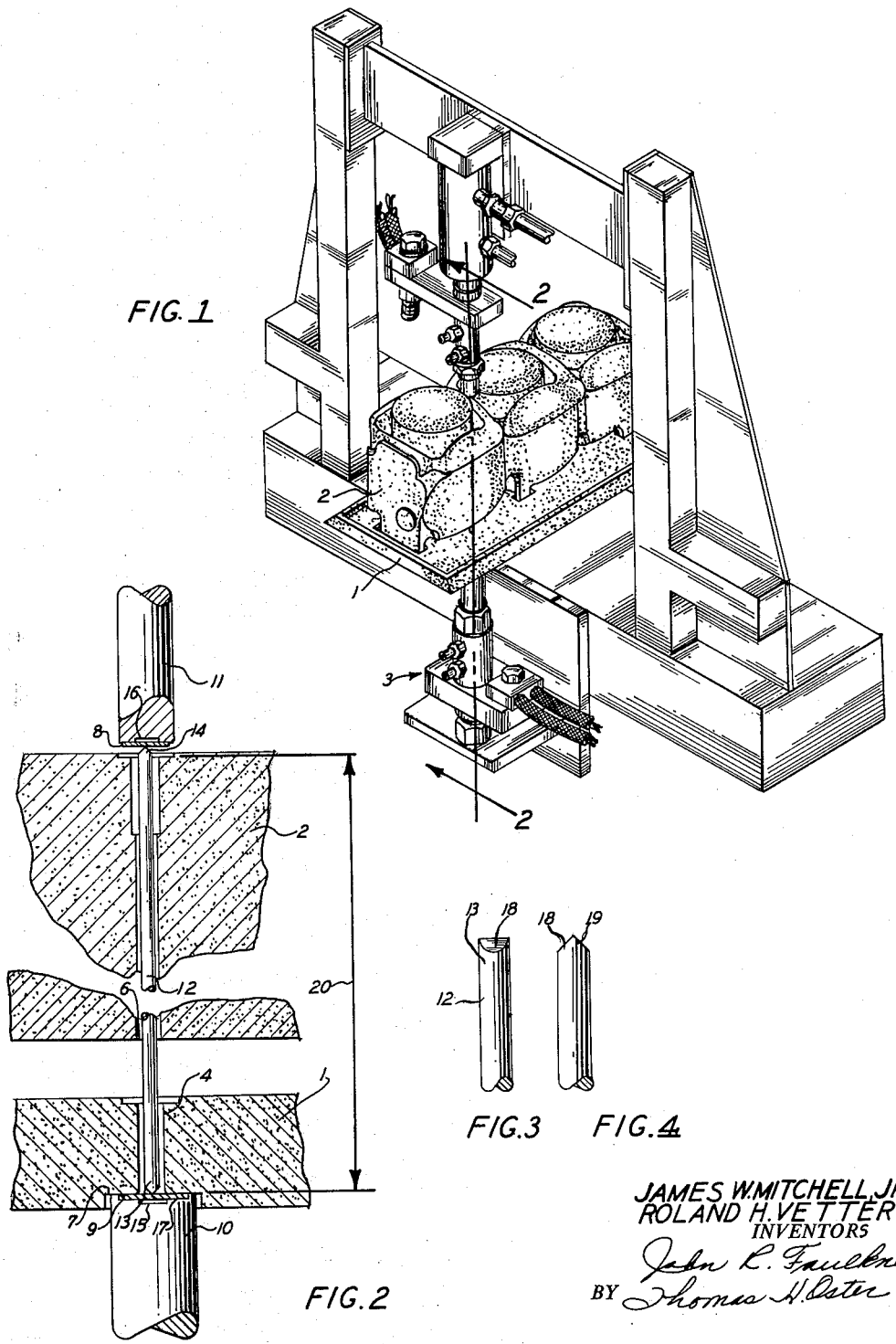

3,112,390
CORE ASSEMBLY BY WELDING
James W. Mitchell, Jr., Detroit, and Roland H. Vetter, Garden City, Mich., assignors to Ford Motor Company, Dearborn, Mich., a corporation of Delaware
Filed Nov. 14, 1961, Ser. No. 152,356
8 Claims. (Cl. 219—107)

This invention relates to the assembly of sand cores. More specifically, this invention relates to the assembly of engine block sand cores by resistance welding techniques.

A present method of assembling sand cores involves the use of a stud having a cold riveted head at one end and a thread at the opposite end. The stud is inserted in the core parts being assembled and a nut and washer are placed on the threaded end of the stud to fasten the core parts to form a core assembly. Applying the foregoing method to the assembly of engine block cores, four people are required to make 484 core assemblies per hour.

The present invention hereinafter disclosed in detail utilizes a piece of wire placed in the core parts to be assembled. The ends of the wire are welded to two discs to fasten the core parts together to form a core assembly. This method of connecting the core parts provides a tightened core assembly at a lower cost and in a shorter production time cycle.

It is an object of this invention to provide an improved method and apparatus for assembling cores.

Another object of the invention is to provide an improved method and apparatus for assembling cores utilizing welding.

Another object of the invention is to provide a method and apparatus to assemble cores at a high production rate.

Another object of the invention is to provide a method of assembling sand cores that can be easily automated.

Further objects will appear in the written description and other objects will be obvious.

FIGURE 1 is a perspective view showing the welding apparatus with an engine block core assembly inserted therein.

FIGURE 2 is a partial section taken along line 2—2 of FIGURE 1.

FIGURE 3 is a front view of the wire ends utilized in accordance with the invention.

FIGURE 4 is an end view of the wire ends utilized in accordance with the invention.

Referring to FIGURE 1, the barrel slab core 1 and water jacket core 2 are placed in the welding machine 3. Shown more specifically in FIGURE 2, barrel slab core 1 has a hole 4 which is countersunk to receive a holding means or more particularly a disc 9 and a lower electrode 10. The hole 4 in the barrel slab core 1 is aligned with hole 6 in the water jacket core 2. The hole 6 in the water jacket core 2 is countersunk to receive a holding means or more particularly disc 8 and an upper electrode 11. The holes 4, 6 in the core parts are ¼ inch in diameter.

A wire 12 is inserted in the aligned holes 4, 6. The lower electrode 10 holds the disc 9 in contact with surface 7 and the chisel point end 13 of wire 12. The upper electrode 11 holds the disc 8 against the chisel point end 14 of the wire 12. The ends of the electrodes 10, 11 have deformation recesses 15, 16 respectively, which are provided to permit deformation of the discs when pressure is applied to the discs during the welding operation. The recess in electrode 11 is .040 inch x 0.22 inch. The recess in electrode 10 is .040 inch x 0.30 inch. In addition to the deformation recess 15, lower electrode 10 has a positioning recess 17 which receives the disc 9 for holding and positioning the disc 9. Positioning recess 17 is .025 inch x .675 inch. Upper electrode 11 is .675 inch in diameter and the lower electrode 10 is .750 inch in diameter.

It should be understood that it is within the scope of the invention to utilize a wire having one end with an integral holding means or disc. The integral holding means or disc can be formed by cold heading the wire or by welding a disc or holding means to the wire before inserting the wire in the core parts to be assembled.

Referring to FIGURES 3 and 4, the wire 12 is .125 inch in diameter and has irregular ends or more particularly chisel point ends 13, 14. The chisel point ends 13, 14 have faces 18, 19 which are at right angles to each other. These faces are formed when the wire is cut. The cutting of the wire can be accomplished by a press utilizing a shearing die, a technique which is well known in the art. The length of wire 12 is between .020 inch to .070 inch longer than the length 20 of the holes 4, 6. The oversizing of the wire allows for variations in the dimensions of the core and wire length and for upsetting and phase change contraction during welding. The dimensional variations caused by phase change contraction is described in U.S. Patent 2,648,022, August 4, 1953. Further, to obtain a satisfactory weld, it is preferred that the steel disc have an upset of .010 inch per disc, or 0.020 inch for two discs; hence, a wire 0.020 inch longer than the length 20 of the core holes 4, 6 being assembled is utilized. It is preferred that the greatest oversize possible be used in order to allow for sand core dimensional variation. Straight wires oversized 0.070 inch have been used satisfactorily. It should be understood that it is within the scope of the invention to apply sufficient force during the welding operation to bend wire 12 to form a bent configuration, thus permitting the wires to be greatly oversized.

Deformation recesses 15, 16 in the lower and upper electrodes 10, 11, respectively, are provided to allow for the upsetting of the discs 8, 9 which takes place when pressure is applied by the lower and upper electrodes 10, 11 to chisel point ends 13, 14 of wire 12. The use of chisel point ends 13, 14 increases the resistance of the wire at the point of contact with the disc and concentrates the heating of the discs which are in contact with the particular wire end and thereby gives rise to a high quality weld. The chisel point ends 13, 14 also facilitate the upsetting of the discs 8, 9.

The welding control circuit used in performing the welding operation is well known in the art and discussed in detail in "Resistance Welding Manual," Volume 2, Chapter 23 (third edition, 1961), published by Resistance Welding Manufacturers' Association. It has been found that a welding control circuit wherein the welding transformer has a minimum open circuit secondary voltage of 27 volts and an upslope phase shift heat control attachment is satisfactory. The upslope phase shift heat control attachment is utilized to compensate for the rapid increase of resistance caused by temperature rise due to the resistance heating. The upslope heat control compensates for the resistance change by providing a higher voltage during the period when the resistance is increasing. For a more detailed discussion of upslope phase shift heat control see "Resistance Welding Manual," Volume 3, pages 126–130 (third edition, 1961), published by Resistance Welding Manufacturers' Association.

Using the welding apparatus described above and the wire configurations discussed and shown in FIGURES 2, 3, two steel discs may be welded to a ⅛ inch diameter wire approximately 6½ inches long by applying an electrode force of 60 pounds for 5 cycles with a maximum secondary current of 4000 amperes.

In summary, the method of assembling sand cores comprises: placing holes in the core parts to be assembled, aligning the holes in the various core parts to be assembled, cutting a wire with a chisel pointed end or ends and longer in length than the length of the aligned holes, placing the wire in the aligned holes, placing a disc or discs in contact with the end of the wire, placing an electrode in contact with the disc or discs and applying a force and a current to the disc or discs to form a welded joint between the end or ends of the wire and the disc or discs, thereby rigidly connecting the core parts being assembled.

It is to be understood that the present invention is not limited to the particular details as described above. Many equivalents for the specific elements and arrangements utilized in the above disclosure will suggest themselves to those skilled in the art. For example, various types of wire ends may be used; and many configurations other than the discs may be used.

We claim:

1. A method of assembling a sand core which sand core includes core parts having dimensions which unpredictably vary within a given range comprising: causing holes to be placed in said core parts to be assembled, said holes extending through said core parts to be assembled, aligning said core parts to be assembled so that a channel is formed by the aligned holes when said core parts are in a desired relationship, placing a wire having an end with an integral holding means, a formed end and a length greater than said channel in said core parts so that said formed end can be placed in contact with another holding means, placing a holding means in contact with said formed end of said wire, said holding means so placed in contact with said formed end that joining said holding means to said wire end will fasten said core parts being assembled to form a substantially rigid sand core assembly, causing an electrode to contact the end of said wire having said integral holding means, causing an electrode to contact said holding means which is in contact with said formed end of said wire, causing a current to flow through said wire and said holding means, said current being of sufficient magnitude to cause the wire and said holding means to soften, and causing a sufficient force to be exerted upon said wire and holding means so that said holding means is upset and a welded joint is formed between the end of the wire and said holding means, thereby fastening said parts having dimensions which vary unpredictably within a given range, to form a substantially rigid sand core assembly.

2. A method of assembling a sand core which sand core includes parts having dimensions which indeterminably vary within a given range comprising: causing holes to be placed in the parts to be assembled, said holes extending through the parts to be assembled, aligning said parts to be assembled so that a channel is formed by the aligned holes when said parts are in a desired relationship, placing a wire having an end with a holding means, an irregular end, and a length greater than said channel in said core parts so that said irregular end can be placed in contact with another holding means, placing a holding means in contact with said irregular end of said wire, said holding means placed in contact with said irregular end so that joining said disc to said wire end will fasten the parts being assembled to form a substantially rigid said core assembly, causing an electrode to contact the end of said wire having said holding means, causing an electrode to contact said holding means which is in contact with said irregular end of said wire, causing a current to flow through said wire and holding means, said current being of sufficient magnitude to cause the wire and holding means to soften, and causing a force to be exerted upon said wire and holding means so that a welded joint is formed between the end of the wire and said holding means, thereby fastening said parts having dimensions which vary indeterminably within a given range, to form a substantially rigid sand core assembly.

3. A method of assembling parts made of sand to form sand cores, wherein each of said sand parts being assembled has dimensions which indeterminably vary within a given range, comprising: causing holes to be placed in the sand parts to be assembled, said holes extending through the sand parts to be assembled, aligning the holes in the parts to be assembled so that a continuous channel is formed by the aligned holes, forming a wire having chisel pointed ends, placing said wire in said channel, causing a plurality of discs to contact the chisel pointed ends of said wire, said discs so placed in contact with said wire end so that joining said plurality of discs to said wire ends will fasten the parts being assembled to form a substantially rigid sand core assembly, causing an electrode to contact each disc, causing a current to pass through a circuit, said electrodes, discs and wire forming an integral part of said circuit, said current passing through said circuit being of sufficient magnitude to cause said wire and said plurality of discs to soften, causing a force to be applied to said plurality of discs and wire, said force being of sufficient magnitude to cause said plurality of discs to be upset, so that a welded joint is formed between the ends of the wire and each disc, thereby fastening said parts, having dimensions which vary indeterminably within a given range, to form a substantially rigid sand core assembly.

4. A method of assembling parts, each of said parts being assembled having dimensions which unpredictably vary within a given range comprising: placing holes in the parts to be assembled, said holes extending through the parts to be assembled so that a wire can be placed through the aligned holes when said parts are in a desired relationship, placing a straight wire having a length greater than the length of the aligned holes in said core parts so that holding means may be brought into contact with the wire ends, placing two holding means in contact with the ends of said wire that has been placed in the aligned holes, said holding means so placed in contact with said wire ends so that joining said holding means to said wire ends will fasten the parts being assembled to form a substantially rigid member, placing an electrode in contact with each holding means, causing a current to flow through a circuit which said electrodes, holding means and wire form an integral part, said current being of sufficient magnitude to cause the wire and holding means to soften, and causing a force to be applied to said wire and holding means, said force being of such magnitude that said wire is maintained substantially straight and said discs are upset, so that a welded joint is formed between the ends of the wire and each holding means, thereby fastening said parts having dimensions which vary indeterminably within a given range, to form a substantially rigid member.

5. The method of assembling sand cores, which sand cores include a number of parts having dimensions which indeterminably vary within a given range comprising: placing holes in the parts to be assembled, said holes extending through the parts to be assembled, aligning the holes in the parts to be assembled so that a wire can be placed through the aligned holes when the parts are in a desired relationship, placing a wire with a chisel point end and a holding means at the other end of said wire in the aligned holes so that said chisel pointed end of the wire extends beyond the aligned holes, said wire being of sufficient length to extend through said aligned holes, causing a holding means to contact the chisel pointed end of said wire, said holding means so placed in contact with said wire end that joining the holding means to the wire end will fasten the parts being assembled to form a substantially rigid member, placing an electrode in contact with said holding means, placing an electrode in contact with said holding means at the other end of said wire, causing a current to flow through a circuit of which said electrodes, holding means and wire form an integral part, said current being of sufficient magnitude to cause the wire and holding means to soften, and causing a sufficient force to be exerted upon said wire and holding means so that the holding means will upset and a welded joint is formed between said chisel pointed end of the wire and said holding means, thereby fastening said parts having dimensions which vary indeterminably within a given range, so that a substantially rigid sand core assembly is formed.

6. A method of assembling cores comprising: placing holes in the core parts to be assembled, aligning the holes in the core parts to be assembled so that a wire can pass through said aligned holes, placing a wire with chisel pointed ends and of sufficient length to extend through and beyond said aligned holes in said aligned holes so that one end of the wire extends beyond the surface of one of said aligned holes, causing holding means to contact the chisel pointed ends of said wire, causing an electrode to contact each holding means, causing a current to pass through said electrodes, holding means and wire, and causing a sufficient force to be exerted upon said wire and holding means so that said holding means are upset, and a welded joint is formed between the end of the wire and said holding means.

7. A method of assembling cores comprising: placing holes in the core parts to be assembled, aligning the holes in the core parts to be assembled so that a wire can pass through said aligned holes, placing a wire in said aligned holes, said wire having at least two ends and being of sufficient length to extend through said aligned holes, causing two holding means to contact the ends of said wire, causing an electrode to contact each holding means, causing a current to pass through said electrodes, holding means and wire, said current being of sufficient magnitude to cause said holding means and wire to soften and causing a force to be applied to said holding means whereby a welded joint is formed between the ends of said wire and said holding means.

8. A method of assembling cores comprising: placing holes in the core parts to be assembled, aligning the holes in the core parts to be assembled so that a wire can pass through said aligned holes, placing a wire in said aligned holes, said wire having a wire end, an integral holding means at the other end and being of sufficient length to extend through said aligned holes, causing a holding means to contact said wire end of said wire, causing an electrode to contact said integral holding means and said holding means, causing a current to pass through said electrodes, holding means, integral holding means and wire, said current being of sufficient magnitude to cause said holding means and wire to soften and causing a force to be applied to said holding means and said integral holding means, whereby a welded joint is formed between the end of said wire and said holding means.

References Cited in the file of this patent

UNITED STATES PATENTS

| 1,754,205 | Jones | Apr. 8, 1930 |
| 2,327,924 | Mounts | Aug. 24, 1943 |